Figure 1:
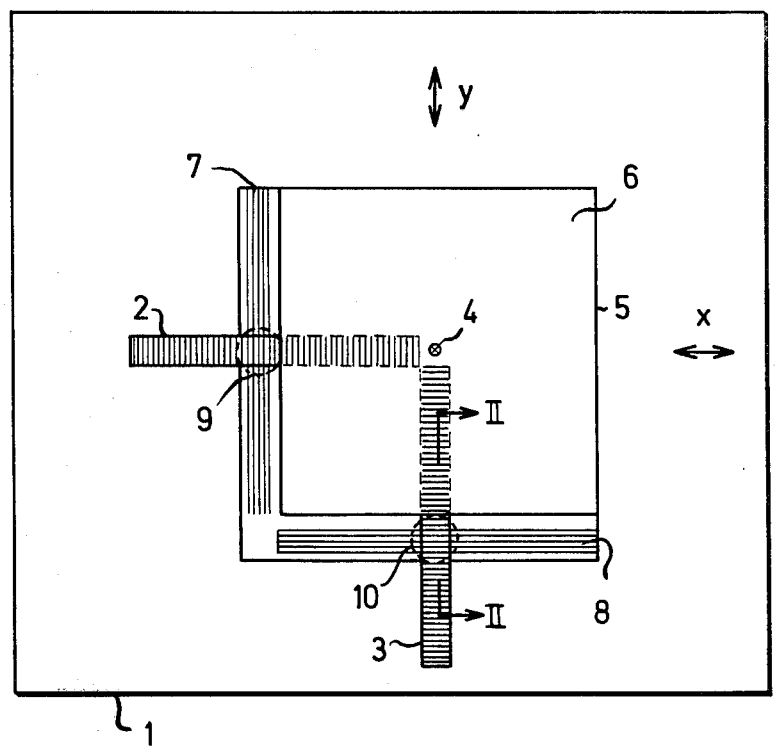

United States Patent [19]

Schwebel

[11] 4,074,131

[45] Feb. 14, 1978

[54] APPARATUS FOR MEASURING OR SETTING TWO-DIMENSIONAL POSITION COORDINATES

[75] Inventor: Reiner Schwebel, Aalen, Germany

[73] Assignee: Carl Zeiss-Stiftung, Oberkochen, Germany

[21] Appl. No.: 682,504

[22] Filed: May 3, 1976

[30] Foreign Application Priority Data

May 15, 1975 Germany .............................. 2521618

[51] Int. Cl.² .............................................. H01J 3/14
[52] U.S. Cl. ................................. 250/237 G; 356/169
[58] Field of Search ........ 250/237 R, 237 G, 231 SE; 356/169, 170; 340/347 D

[56] References Cited

U.S. PATENT DOCUMENTS

| | | | |
|---|---|---|---|
| 3,533,702 | 10/1970 | Hock et al. ...................... | 250/237 G |
| 3,633,038 | 1/1972 | Falk ................................. | 250/237 G |
| 3,867,035 | 2/1975 | Kaul .................................. | 356/169 |
| 3,867,038 | 2/1975 | Westell ........................... | 250/237 G |

Primary Examiner—David C. Nelms
Attorney, Agent, or Firm—Hopgood, Calimafde, Kalil, Blaustein & Lieberman

[57] ABSTRACT

The invention contemplates a system of two-dimensional grid markings for use in accurate two-coordinate identification of the instantaneous relative position of two closely spaced parallel surfaces, one of which may be on a slide-mounting base or plate, and the other of which may be on a movable slide to be viewed, as by microscope, at one or more selected regions in the field of the slide. For the disclosed embodiment, each of two orthogonally related grid markings on the base is orthogonally oriented with respect to a different one of two orthogonally related grid markings on the slide, and parallel lines of intersecting grids are in the same direction. Photoelectric means is disclosed for response to light modulation attributable to the respective x-y components of any given slide displacement, and digital techniques utilize the photoelectric response for measuring and/or control slide displacement.

15 Claims, 2 Drawing Figures

APPARATUS FOR MEASURING OR SETTING TWO-DIMENSIONAL POSITION COORDINATES

The present invention relates to a device for measuring or setting two-dimensional position coordinates of a slide.

It is already known to provide such devices with two scales which are perpendicular (orthogonal) to each other and the extensions of which intersect in the axis of a microscope which is provided with a measurement mark. This arrangement is selected in order to be able to satisfy the Abbe comparator principle for both coordinates. Each of these scales cooperates with a reading index. In this connection it is already known to develop the reading indices such that the reading index for one coordinate direction comprises hairlines which extend over the entire measurement length of the other coordinate direction.

It is possible to arrange the scales in fixed position on a support and to connect the reading hairlines with the displaceable slide. It is also possible to arrange the reading marks fixed on the support and to displace the scales. However, in each case, it is necessary to effect a visual reading for each coordinate direction. Such visual reading is cumbersome and is subject to subjective errors.

In the case of comparators for photogrametric purposes, and where a plurality of image coordinates must be identified, the possibility of automatic measurement is particularly desirable.

An existing device to solve this problem provides the displaceable slide with two linearly ground straight edges which are arranged at right angles to each other and against which straight-edge sensors are pressed by spring pressure; these sensors cooperate with two scales, arranged at right angles to each other and in fixed position on a support. Each sensor contains a source of light, a short reading grid and a photoelectric receiver. Upon displacement of the slide, each sensor so slides along one of the straight edges that it in all cases moves along the scale associated with it. In this way, a signal is produced which serves to measure the position coordinates in known manner.

This known device has the disadvantage that precision of the measurement is affected to a substantial extent by the fidelity of the straight edges against which the sensors are pressed. Moreover, the parts which slide against each other are subject to wear, so that long-time constancy of the measuring device is not assured.

A general object of the invention is to provide an improved device of the character indicated, avoiding noted deficiencies of past devices.

A specific object is to provide a device for measuring or setting the two-dimensional position coordinates of a slide which makes it possible to effect an automatic and accurate measurement which can be reproduced at all times and which nevertheless is of technically simple and inexpensive construction.

The invention proceeds from a device in which there are provided two measurement grids which are arranged fixed at right angles to each other and the point of intersection of which coincides with a measurement mark, each of them cooperating with a reading index connected with the slide. In accordance with the invention, each reading index is developed as a scanning grid which extends over the entire measurement length of the other coordinate direction, and a photoelectric sensor for detecting the position with respect to the associated measurement screen is provided for each scanning grid. Each scanning grid consists of a plurality of hairlines extending parallel to each other, their distance apart and thickness corresponding to the associated measurement grid. In this connection, it is advisable that the scanning grid be produced by vapor deposition and that it be applied directly on the slide or on the object itself. In the measurement, the slide is moved with respect to the measurement mark. In this connection, the scanning grids move over the measurement grids, one scanning grid being associated with each measurement grid in each position of the slide. The sensors which, in case of measurement under incident light, consist only of a source of light and a photoelectric receiver, are displaced in the coordinate directions together with the slide. They therefore always give a signal which serves to count the number of hairlines (of the measurement grid) which have been traversed and which, by means of a subsequent interpolator, also enables determination of intermediate positions of measurement and scanning grids.

With the new device it is therefore merely necessary to displace the slide with respect to the measurement marks while all other components which affect the precision of measurement are fixed in position. This permits a technically simple construction with assures high constancy for a long time.

The new device can also be used for measurement in transmitted light. In this case, the source of light and the receiver are arranged on different sides of the grids.

Figure 2:
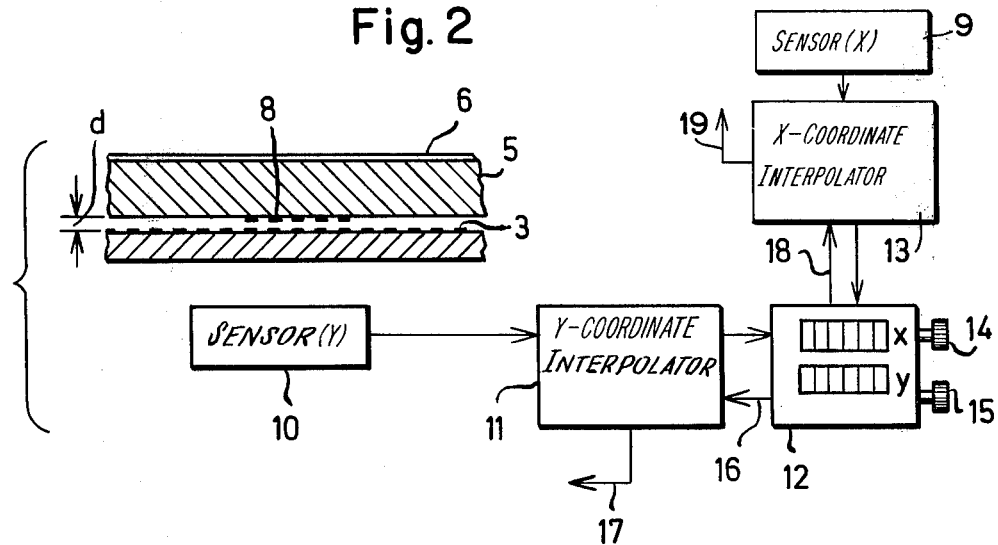

The invention will be explained in further detail below with reference to FIGS. 1 and 2 of the accompanying drawings in which:

FIG. 1 is a basic diagram showing the principle of the new apparatus, seen from above; and FIG. 2 is an enlarged sectional view, taken in the plane II—II of FIG. 1, with schematic indication of associated detection, signal-processing and display apparatus.

In FIG. 1, 1 is a fixed base on which two orthogonally related measurement grids 2 and 3 are so fixed in position that their point of intersection coincides with a measurement mark 4. This measurement mark may for example be physically presented to the viewer as a marking cross in the focal plane of the eye piece of an observation microscope, and therefore the numeral 1 will be understood to designate the fixed base of a microscope, and the mark 4 sill be understood to be a schematic showing of a point in the focal plane of the microscope. Each of the grids 2–3 is shown with inscribed uniformly spaced parallel markings transverse to the elongation direction of the particular grid.

A slide 5 is so arranged on the base 1 that it can be displaced only in the two coordinate directions $x$ and $y$. For reasons of simplicity, details of all guide and drive elements for the displacement of the slide 5 have been omitted in FIG. 1, but they are schematically suggested by the double arrows $x$ and $y$. On the slide 5 there is arranged, for instance, a photogrametric picture 6, in which picture-point coordinates are to be determined.

Two scanning grids 7 and 8 are shown with similar spaced markings which extend in the grid-elongation direction and over the entire measurement length of their respective orthogonally related coordinate directions, the same being firmly connected to the slide 5 or applied directly on it. Each of these scanning grids consists of a plurality of parallel lines, the spacing and thickness of which correspond to those of the associated measurement grid, as can be noted in particular from FIG. 2.

In the illustrative embodiment shown, the base 1 is transparent and two sensors 9 and 10 are so arranged below the measurement grids 2 and 3 in such a manner that they are displaced in the two coordinate directions together with the slide 5. Each of these sensors may consist of a source of light and a photoelectric receiver.

Upon a displacement of the slide 5 with respect to the measurement mark 4, the scanning grids 7 and 8 move over the measurement grids 2 and 3, so that in each position of the slide 5 the light coming from one of the sensors 9 or 10 passes through the associated measurement and scanning grids so as to produce a signal which directly digitally fixes the picture coordinates $x$ and $y$.

The $y$-coordinate sensor 10 is connected with an interpolator 11 which serves for signal processing, including interpolation of the sensor signal and thus for determining intermediate positions of the $y$-coordinate measurement and scanning grids 3-8. Interpolator 11 supplies a digital signal, which is directly indicative of the $y$-coordinate (or of a change in the $y$-coordinate); this digital signal is fed to a suitable display or indicating device 12. In similar fashion, a digital signal which indicates the $x$-coordinate is concurrently developed by the sensor 9 and is fed to the indicating instrument 12 via an interpolator 13. Once correctly calibrated at the respective interpolators, the displayed $x$-$y$ coordinates at 12 will always correctly locate (within slide 5) the picture point currently viewed in register with the measurement mark 4.

It will be appreciated that the described device permits very accurate measurement of two-dimensional position coordinates, it being possible to readily obtain a precision of measurement of 1$\mu$m. The physical space $d$ between adjacent opposed measurement and scanning grids (2-7, and 3-8) is largely determined by line thickness and spacing in the grids, i.e., by the desired accuracy to be obtained. The resultant spacing $d$ can be maintained by technically simple means over a large range of displacement of the slide 5 so that, for example, point coordinates within pictures of a size of 250 × 250 mm can be readily measured, all without wear of measuring elements. Thus, the new device is excellently suited as a comparator for photogrametric purposes.

While the invention has been described in detail in connection with the measurement or ascertainment of coordinates for a particular point of interest within the picture or field of a slide 5, it will be understood that principles of the invention are equally applicable to the precise positioning (or repositioning) of a point within a picture or field of a slide-mounted specimen, as for example by setting an $x$-coordinate control (14) and a $y$-coordinate control (15) at the indicator 12. Thus, for the case of a given $y$-coordinate setting at 15, an appropriate digital-signal connection 16 to the interpolator 11 will enable the latter to make such directional and quantitative evaluation (of the setting of knob 15, in terms of the instantaneous output of sensor 10) as to enable interpolator 11 to provide a suitably poled output drive signal to $y$-coordinate slide-positioning means, suggested at 17. By the same token, a similar output 18 from display means 12 may provide an output control signal to the interpolator 13 for an $x$-coordinate drive, involving X-coordinate slide-positioning means, suggested at 19.

What is claimed is:

1. A device for measuring or setting two-dimensional position coordinates of an object, comprising a movable object-bearing slide and a support for said slide, means coacting between said slide and said support for limiting their relative displacement to non-rotational displacement in essentially a single plane, two elongate measurement grids fixedly disposed on said support at right angles to each other and parallel to said plane, the point of intersection of the alignments of said grids coinciding with a measurement mark and each of said grids cooperating with a separate reading index carried directly by said object-bearing slide, the reading index for each coordinate direction being an elongate scanning grid of an effective length which is substantially the measurement length of the other coordinate direction, each of said grids comprising only a single set of parallel lines which are oriented parallel to one or the other of orthogonally related components of the non-rotational displacement, and a photoelectric sensor associated with each scanning grid for detecting position with respect to the associated measurement grid, whereby each sensor may provide a digit-countable output signal indicative of the component of displacement scanned thereby.

2. A device according to claim 1, in which each scanning grid consists of a plurality of lines extending parallel to each other, the spacing and thickness and orientation of said lines being equal to the spacing and thickness and orientation of lines in the associated measurement grid.

3. A device according to claim 2, in which said scanning grids are carried directly on the slide.

4. A device according to claim 1, in which said measurement and scanning grids are disposed on facing surfaces of said support and slide.

5. A device according to claim 1, in which signal-interpolation means has separate electrical connection to the respective signal outputs of said sensors.

6. A two-coordinate positional-sensing device, comprising support and object-bearing slide members having uniformly spaced adjacent surfaces and including means guiding and supporting the same for only two-component relative motion, a first pair of orthogonally related grids carried directly on one of said surfaces, a second pair of orthogonally related grids carried directly on the other of said surfaces, one grid of each pair being orthogonally oriented with respect to and in intersecting overlap with one grid of the other pair, thereby establishing first and second intersecting pairs of grids, a single set of plural parallel grid lines on each of said grids, the grid lines of both grids of one intersecting pair being oriented in the same direction, the grid lines of both grids of the other intersecting pair being oriented in the same direction but orthogonal to the grid lines of said one intersecting pair, first-component interpolator means including a first photoelectric device responsive to light modulation produced as the grids of said one intersecting pair are displaced with any component of motion transverse to the grid-line orientation thereof, and second-component interpolator means including a second photoelectric device responsive to light modulation produced as the grids of said other intersecting pair are displaced with any component of motion transverse to the grid-line orientation thereof.

7. The device of claim 6, including display means connected to both said interpolator means for concurrent display of the coordinate outputs of said respective interpolator means.

8. The device of claim 6, including separate orthogonally related drive means for each of two coordinates of positional displacement involved in said relative motion, selectively operable means for setting each of two components of desired relative positioning of said members, each said drive means being connected for differential response to the interpolator means and to the selectively operable means for the associated component of desired positional displacement.

9. The device of claim 6, wherein one of said members is the slide support of a microscope having an optical viewing system wherein a measurement mark is centrally viewed, the respective orthogonally related grids of said one member extending radially with respect to the optically projected intercept of said mark at said surface of said one member.

10. The device of claim 6, wherein one of said members is a transparent plate and said grids are lines of equal width and spacing.

11. In combination, slide-support structure and an object-bearing slide movably supported by said structure, guide means coating between said slide and said support structure and limiting to two orthogonally related directional components the displacement of said slide with respect to said support structure, first and second elongate narrow measurement grids respectively parallel to said components and fixedly disposed on said support structure, the point of intersection of the alignments of said grids coinciding with a generally central measurement mark, first and second elongate narrow reading-index grids extending in orthogonally related directions parallel to said respective directional components of displacement and fixedly carried by two adjacent margins of said slide, each reading-index grid having perpendicular intersecting overlap with one of said measurement grids, and means including two photoelectric sensors movable with said slide for tracking reading-index traverse of the respective measurement-grid intersections therewith.

12. The combination of claim 11, in which said measurement grids each extend on one side only of said measurement mark.

13. The combination of claim 11, in which said slide-support structure is a microscope wherein said measurement mark is on the optical axis of the microscope.

14. The combination of claim 11, in which said slide includes a removable transparent rectangular field-defining element with said reading-index grids respectively forming integral parts of two adjacent margins of said element.

15. The combination of claim 13, in which said measurement grids terminate short of intersection of their alignments, whereby observation of the object field in the vicinity of the measurement mark is unimpaired by said measurement grids.

* * * * *